Feb. 23, 1937.  W. H. BASELT  2,071,964
CLASP BRAKE
Filed Dec. 24, 1934  2 Sheets-Sheet 1

Inventor:—
Walter H. Baselt
By:—

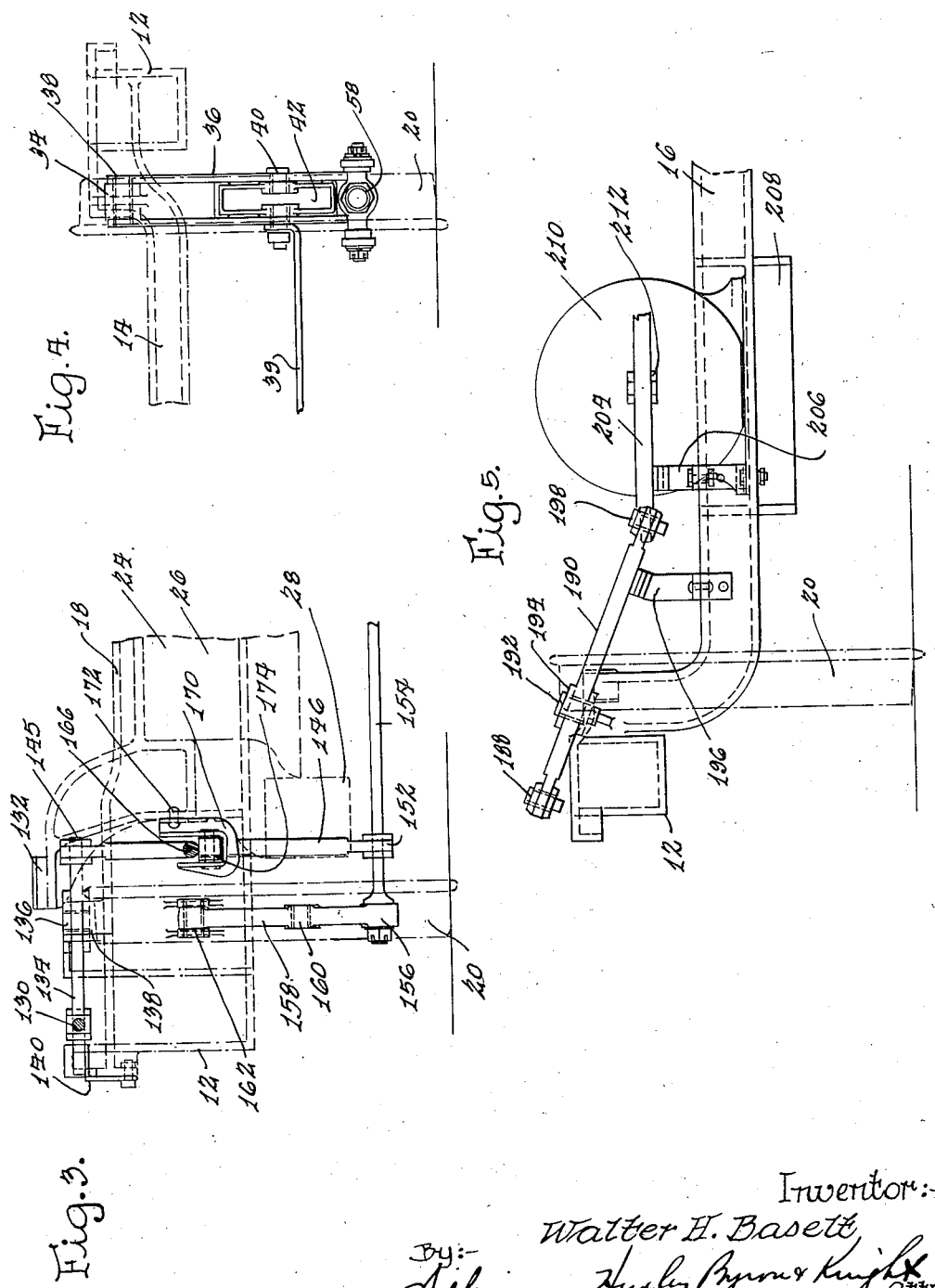

Patented Feb. 23, 1937

2,071,964

UNITED STATES PATENT OFFICE 2,071,964

CLASP BRAKE

Walter H. Baselt, Chicago, Ill., assignor to American Steel Foundries, Chicago, Ill., a corporation of New Jersey Application December 24, 1934, Serial No. 759,113

27 Claims. (Cl. 188—46)

This invention pertains to car trucks, and more particularly to a unit cylinder clasp brake arrangement for six-wheel trucks.

It is an object of this invention to provide a six-wheel truck brake arrangement adapted particularly for use with car trucks wherein traction motors are geared to the two outer axles.

Another object is to provide a brake arrangement wherein beamless brake rigging is operatively associated with a hanger lever connector type of brake rigging.

Yet another object is to provide a brake arrangement for a six-wheel car truck adapted to be operated by unit cylinder operating means.

A further object is to provide a system of brake rigging wherein pull rod connections are used for the application of the brakes, and one which fulfills all conditions of manufacture and service.

A yet further object is to provide a brake arrangement adapted for use on trains of the high speed type wherein positive and effective braking must be provided.

With these and various other objects in view, the invention may consist of certain novel features of construction and operation as will be more fully described and particularly pointed out in the specification, drawings and claims appended hereto.

In the drawings, which illustrate an embodiment of the device and wherein like reference characters are used to designate like parts—

Figure 3 is a fragmentary transverse sectional elevation taken substantially in a plane with the transverse center line of Figure 1;

Figure 4 is a fragmentary transverse end elevation taken substantially at the left end of the truck as viewed in Figure 1;

Figure 5 is a fragmentary transverse end elevation taken substantially at the right end of the truck as viewed in Figure 1, with the brake head and truck levers omitted.

Figure 1:
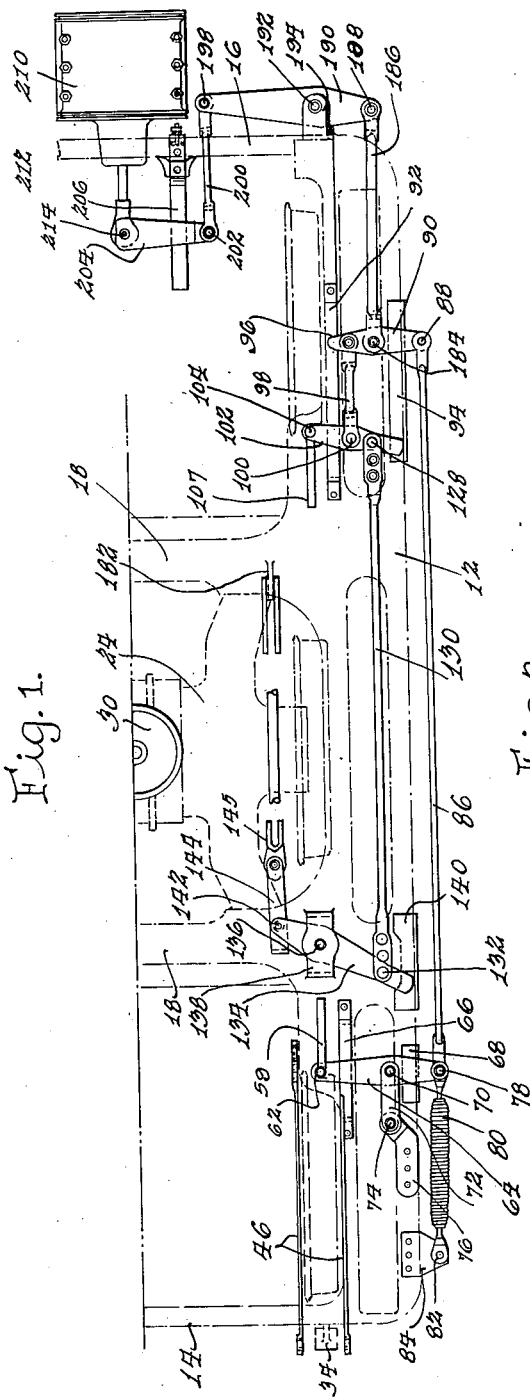
Figure 1 is a fragmentary top plan view of a six-wheel car truck having applied thereto a form of the brake arrangement embodying the invention.
Figure 2:
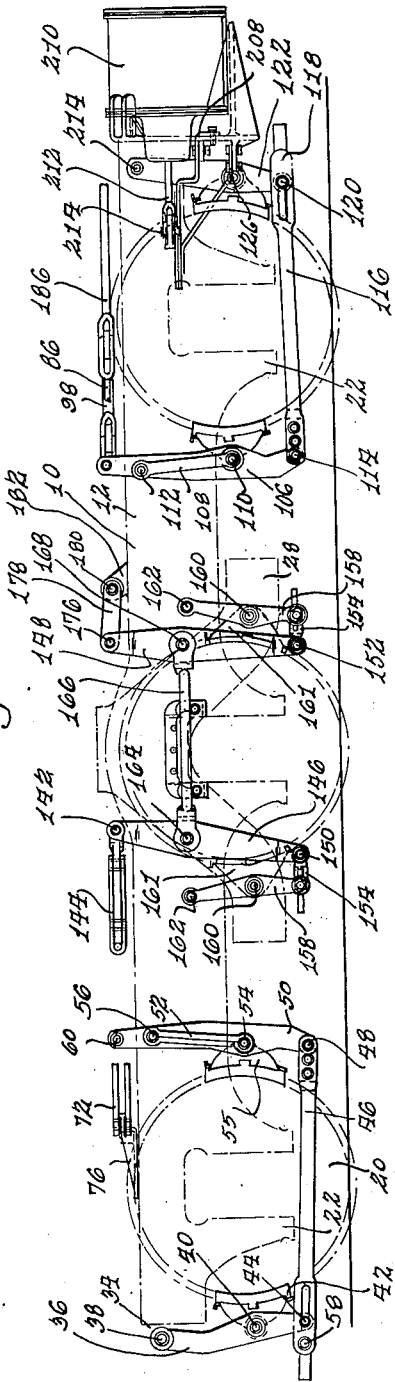
Figure 2 is a side elevation of the truck and brake arrangement illustrated in Figure 1.

In the truck and brake construction illustrated, a six-wheel truck is provided wherein the parts of the truck and brake arrangement are so disposed as to permit gearing of end motors to the end wheel and axle assemblies.

The six-wheel truck illustrated consists essentially of the truck frame 10 including the side frame 12, the side frames at opposite sides of the truck being connected by the end rails 14 and 16 and the spaced transoms 18. Between the end rails 14 and 16, and the transoms 18, there are provided the wheel and axle assemblies 20 the journal ends of which are adapted to have cooperative relation with journal boxes (not shown), the journal boxes being received between the spaced pedestals 22. A swing bolster 24 is provided between the transoms and consists essentially of the main body portion 26, the depending arms 28 extending downwardly and substantially below the transoms 18 and swingably connected thereto through suitable links (not shown). The body portion is provided with the center bearing 30 and the side bearings 32.

The brake arrangement provided for this truck consists of a beamless brake for the two outside or end pairs of wheels, and a hanger lever connector type of brake for the middle pair of wheels. The truck frame is provided at the left end of the truck, as viewed in Figure 1, with the bracket 34 to which the dead truck levers 36 are pivoted as at 38, the truck levers 36 disposed substantially in the plane of the wheel being connected on opposite sides of the truck by means of the strap 39. The strap 39 is pivotally connected as at 40, preferably by the same means which provides the connection for the brake head and shoe assembly 42.

The lower end of the brake lever 36 is pivotally connected as at 44 to connecting straps or pull rod 46 disposed below the axle and pivotally connected at its opposite end as at 48 to the live truck lever 50, said live truck lever being pivotally supported on the side frame by means of the hanger link 52 pivotally connected as at 54 to the live truck lever at the point of connection of the brake head 55 and as at 56 to the truck frame. The connecting straps 46 are provided with the slack adjuster 58 disposed adjacent the dead truck lever 40. The upper end of the live truck lever 50 extends through slot 59 in the side frame and is pivotally connected at 60 as by means of a clevis (not shown) to the inner end 62 of the dead auxiliary lever 64, said dead auxiliary lever being supported on the inner bracket 66 and the outer bracket 68 provided on the side frame.

The auxiliary lever 64 is pivotally connected intermediate the ends thereof as at 70 to the strap link 72, said link being pivotally connected as at 74 to the bracket 76 secured to the truck frame. The outer end of the auxiliary lever is pivotally connected as at 78 to the release spring 80, the other end of which is connected as at 82 to the bracket 84 secured to the truck frame adjacent the end rail 14. The outer end of the auxiliary lever is also pivotally connected as at 78 to the pull rod 86, the other end of said pull rod being pivotally connected as at 88 to the live equalizer lever 90, said equalizer lever being disposed adjacent the end rail 16 and being slidably supported on the inner bracket 92 and the outer bracket 94 provided on the truck frame between the end rail 16 and the adjacent transom 18.

The inner end of the equalizer lever adjacent its support on the bracket 92 is pivotally connected as at 96 to the link 98, the other end of the link 98 being pivotally connected as at 100 to the live auxiliary lever 102 intermediate the ends thereof, said live auxiliary lever also being slidably supported on the brackets 92 and 94. The inner end 104 of said live auxiliary lever is pivotally connected as by means of a clevis (not shown) to the upper end of the live truck lever 106 similar to the live truck lever 50 and extending through the slot 107 provided in the side frame. Said live truck lever is pivotally connected by means of the hanger link 108 pivoted to said live truck lever at the point of connection of the brake head thereto as at 110 and to the truck frame as at 112. The live truck lever 106 is pivotally connected adjacent its lower end as at 114 to connecting straps 116 disposed below the axle and similar to connecting straps 46. The other ends of the connecting straps are provided with the slack adjuster 118 and are pivotally connected as at 120 to the lower end of the dead truck lever 122 similar to the dead truck lever 36, the truck levers 36 and 50, and 106 and 122 being disposed substantially in the plane of the wheels.

The dead truck lever 122 is pivotally connected at its upper end as at 124 to the truck frame, and is provided with the connection 126 for receiving the brake head and shoe assembly and a strap similar to strap 39. The live auxiliary lever 102 is pivotally connected adjacent said outer end as at 128 to the pull rod 130, said pull rod 130 extending toward the opposite end of the truck and being pivotally connected as at 132 to the dead auxiliary lever 134 disposed adjacent the opposite transom 18. The dead auxiliary lever 134 is pivotally connected as at 136 to the bracket 138 (Figures 1 and 3) provided on the truck frame, the outer end of said dead auxiliary lever being slidably supported on the bracket 140 disposed on the truck frame.

The inner end of the dead auxiliary lever is pivotally connected as at 142 to the strap link 144, which in turn is pivotally connected as through the pivoted jaw 145 to the upper end of the live truck lever 146. The live truck lever 146 and the dead truck lever 148 are disposed inwardly of the plane of the wheel of the center wheel and axle assembly. The lower ends of the live and dead truck levers 146 and 148 are pivotally connected as at 150 and 152 to the brake beams 154, the outer ends of said brake beams being pivotally connected as at 156 to the hanger levers 158, said hanger levers 158 being disposed in the plane of the wheels and having a pivotal connection 160 adapted to receive the brake head and shoe assemblies 161, the upper ends of the levers being pivotally connected as at 162 to the truck frame.

The live truck lever 146 is pivotally connected intermediate its ends as at 164 to the pull rod 166, the other end of the pull rod being connected as at 168 to the dead lever 148 intermediate its ends. The bolster is provided with the substantially U-shaped bracket 170 secured thereto as at 172 and provided with the anti-friction rollers 174, said rollers being adapted to anti-frictionally support the pull rod 166. The upper end of the dead truck lever 148 is pivotally connected as at 176 to the link 178, which in turn is pivotally connected as at 180 to the bracket 182 provided on the side frame.

The live equalizer lever 90 is pivotally connected as at 184 intermediate its ends to the pull rod 186, the opposite end of said pull rod being connected as at 188 to the dead cylinder lever 190. Said dead cylinder lever slopes downwardly toward the longitudinal center line of the truck and is pivotally connected as at 192 to the bracket 194 provided on the truck frame adjacent the end rail 16, said cylinder lever being slidably supported by means of the bracket 196 provided on the end rail 16. The inner end of said cylinder lever is pivotally connected as at 198 to the pull rod 200, said pull rod extending inwardly of the end rail 16 and being pivotally connected as at 202 to one end of the equalizer 204, said equalizer being slidably supported on the brackets 206 provided on said end rail. The end rail 16 is also provided with a cylinder bracket 208 adapted to support the operating cylinder 210, the piston 212 of which is pivotally connected as at 214 to the equalizer 204 intermediate its ends.

In operation of this brake arrangement, assuming the brakes to be in released position, movement of the piston rod 212 inwardly causes the equalizer 204 to rotate the cylinder lever in a counter-clockwise direction. Thus the pull rod 186 will move the equalizer lever 90 toward the right as viewed in Figure 1. Movement of the equalizer lever toward the right as viewed in Figure 1 will cause pull rod 86 to move the auxiliary lever 102 toward the right, thus applying the brake shoe, whereupon continued movement will cause the connecting straps 116 to apply the opposite brake shoe. Movement of the auxiliary lever 102 will also cause the pull rod 130 to move toward the right, whereupon the auxiliary lever 134 will be moved in a counter-clockwise direction, thus moving the upper portion of the truck lever 146 in a counter-clockwise direction to apply the brake shoe through connections disposed at the lower end of the truck lever.

Movement of the live truck lever 146 will cause the pull rod 166 to apply the brake shoe disposed to be operated by the lower end of the dead truck lever 148, this truck lever being moved in a clockwise direction about the pivot 176. Movement of the equalizer lever 90 also causes the pull rod 86 to rotate the dead auxiliary lever 64 against the spring 80 in a counter-clockwise direction about the pivot 70, thus causing the live truck lever 50 to be moved in a counter-clockwise direction about the pivot 54 to apply the brake shoe and to cause the connecting straps 46 to move the lever 36 about its pivot 38 to apply its brake shoe. Release of the brake rigging of course operates in a reverse direction, the cylinder lever moving in a clockwise direction to cause this reverse movement of the links and levers, the operation of the system to release position being aided by means of the release spring 80.

It is of course understood that while a brake arrangement on only one side of the truck has been described, this description is equally applicable to the brake arrangement on the opposite side of the truck, the brake arrangement for the truck being symmetrical.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In a brake arrangement, the combination of a truck frame for a six-wheel truck, said frame having a side frame, spaced transoms and end rails, a bolster mounted between said transoms, wheel and axle assemblies for supporting said truck frame, the end of said wheel and axle assemblies being mounted between the respective end rails and the adjacent transom, the center of said wheel and axle assemblies being mounted between said transoms and adjacent said bolster, live and dead truck levers for each wheel, the truck levers for the end wheels being substantially in the plane of said wheels, and the truck levers for the center wheel being disposed inwardly thereof, pull rods connecting the live and dead truck levers of the respective wheels, the rods of the end wheels being disposed below the axles thereof, and the rod of said center wheel being disposed above the axle thereof, a dead auxiliary lever adjacent one of the end live truck levers and pivoted adjacent one end thereof to said live truck lever, said auxiliary lever being pivoted to the truck frame intermediate its ends, a live auxiliary lever slidably mounted on said truck frame adjacent the live truck lever of the other end wheel and axle assembly and pivoted adjacent an end thereof to said last named live truck lever, a live equalizer lever slidably mounted on said truck frame between said live auxiliary lever and the adjacent end rail and connected adjacent an end thereof to said live auxiliary lever intermediate its ends, the other end of said equalizer lever being connected to the other end of said dead auxiliary lever, a dead auxiliary lever pivoted intermediate its ends to said truck frame and connected adjacent its inner end to the live truck lever of the center wheel and axle assembly, the outer end of said last named auxiliary lever being connected to the live auxiliary lever adjacent its outer end, an operating cylinder mounted on the end rail of the truck frame adjacent said live equalizer lever and disposed outwardly of said end rail, an equalizer slidably mounted inwardly of said end rail and connected intermediate its ends to the piston of said cylinder, a dead cylinder lever pivoted to said truck frame outwardly of said end rail and connected adjacent its inner end to one end of said equalizer, the outer end of said cylinder lever being connected to said equalizer lever intermediate its ends.

2. In a brake arrangement, the combination of a truck frame for a six-wheel truck, said frame having a side frame, spaced transoms and end rails, a bolster mounted between said transoms, wheel and axle assemblies for supporting said truck frame, the end of said wheel and axle assemblies being mounted between the respective end rails and the adjacent transom, the center of said wheel and axle assemblies being mounted between said transoms and adjacent said bolster, live and dead truck levers for each wheel, the truck levers for the end wheels being substantially in the plane of said wheels, the truck levers for the center wheel being disposed inwardly thereof, pull rods connecting the live and dead truck levers of the respective wheels, a dead auxiliary lever adjacent one of the end live truck levers and pivoted adjacent one end thereof to said live truck lever, said auxiliary lever being pivoted to the truck frame intermediate its ends, a live auxiliary lever slidably mounted on said truck frame adjacent the live truck lever of the other end wheel and axle assembly and pivoted adjacent an end thereof to said last named live truck lever, a live equalizer lever slidably mounted on said truck frame between said live auxiliary lever and the adjacent end rail and connected adjacent an end thereof to said live auxiliary lever intermediate its ends, the other end of said equalizer lever being connected to the other end of said dead auxiliary lever, a dead auxiliary lever pivoted intermediate its ends to said truck frame and connected adjacent its inner end to the live truck lever of the center wheel and axle assembly, the outer end of said last named auxiliary lever being connected to the live auxiliary lever adjacent its outer end, an operating cylinder mounted on the end rail of the truck frame adjacent said live equalizer lever and disposed outwardly of said end rail, an equalizer slidably mounted inwardly of said end rail and connected intermediate its ends to the piston of said cylinder, a dead cylinder lever pivoted to said truck frame outwardly of said end rail and connected adjacent its inner end to one end of said equalizer, the outer end of said cylinder lever being connected to said equalizer lever intermediate its ends.

3. In a brake arrangement, the combination of a truck frame for a six-wheel truck, said frame having a side frame, spaced transoms and end rails, a bolster mounted between said transoms, wheel and axle assemblies for supporting said truck frame, the end of said wheel and axle assemblies being mounted between the respective end rails and the adjacent transom, the center of said wheel and axle assemblies being mounted between said transoms and adjacent said bolster, live and dead truck levers for each wheel, the truck levers for the end wheels being substantially in the plane of said wheels, the truck levers for the center wheel being disposed inwardly thereof, pull rods connecting the live and dead truck levers of the respective wheels, the rods of the end wheels being disposed below the axles thereof, the rod of said center wheel being disposed above the axle thereof, a dead auxiliary lever adjacent one of the end live truck levers and pivoted adjacent one end thereof to said live truck lever, said auxiliary lever being pivoted to the truck frame intermediate its ends, a live auxiliary lever slidably mounted on said truck frame adjacent the live truck lever of the other end wheel and axle assembly and pivoted adjacent an end thereof to said last named live truck lever, a live equalizer lever slidably mounted on said truck frame between said live auxiliary lever and the adjacent end rail and connected adjacent an end thereof to said live auxiliary lever intermediate its ends, the other end of said equalizer lever being connected to the other end of said dead auxiliary lever, a dead auxiliary lever pivoted intermediate its ends to said truck frame and connected adjacent its inner end to the live truck lever of the center wheel and axle assembly, the outer end of said last named auxiliary lever being connected to the live auxiliary lever adjacent its outer end, and operating means for said brake arrangement connected to said equalizer lever intermediate the ends thereof.

4. In a brake arrangement, the combination of a truck frame for a six-wheel truck, said frame having a side frame, spaced transoms and end rails, a bolster mounted between said transoms, wheel and axle assemblies for supporting said truck frame, the end of said wheel and axle assemblies being mounted between the respective end rails and the adjacent transom, the center of said wheel and axle assemblies being mounted between said transoms and adjacent said bolster, live and dead truck levers for each wheel, the truck levers for the end wheels being substantially in the plane of said wheels, the truck levers for the center wheel being disposed inwardly thereof, pull rods connecting the live and dead truck levers of the respective wheels, a dead auxiliary lever adjacent one of the end live truck levers and pivoted adjacent one end thereof to said live truck lever, said auxiliary lever being pivoted to the truck frame intermediate its ends, a live auxiliary lever slidably mounted on said truck frame adjacent the live truck lever of the other end wheel and axle assembly and pivoted adjacent an end thereof to said last named live truck lever, a live equalizer lever slidably mounted on said truck frame between said live auxiliary lever and the adjacent end rail and connected adjacent an end thereof to said live auxiliary lever intermediate its ends, the other end of said equalizer lever being connected to the other end of said dead auxiliary lever, a dead auxiliary lever pivoted intermediate its ends to said truck frame and connected adjacent its inner end to the live truck lever of the center wheel and axle assembly, the outer end of said last named auxiliary lever being connected to the live auxiliary lever adjacent its outer end, and operating means for said brake arrangement connected to said equalizer lever intermediate the ends thereof.

5. In a brake arrangement, the combination of a truck frame for a six-wheel truck, said frame having a side frame, spaced transoms and end rails, a bolster mounted between said transoms, wheel and axle assemblies for supporting said truck frame, the end of said wheel and axle assemblies being mounted between the respective end rails and the adjacent transom, the center of said wheel and axle assemblies being mounted between said transoms and adjacent said bolster, live and dead truck levers for each wheel, the truck levers for the end wheels being substantially in the plane of said wheels, the truck levers for the center wheel being disposed inwardly thereof, pull rods connecting the live and dead truck levers of the respective wheels, the rods of the end wheels being disposed below the axles thereof, the rod of said center wheel being disposed above the axle thereof, a dead auxiliary lever adjacent one of the end live truck levers and pivoted adjacent one end thereof to said live truck lever, said auxiliary lever being pivoted to the truck frame intermediate its ends, a live auxiliary lever slidably mounted on said truck frame adjacent the live truck lever of the other end wheel and axle assembly and pivoted adjacent an end thereof to said last named live truck lever, a connection between said live and dead auxiliary levers, a dead auxiliary lever pivoted intermediate its ends to said truck frame and connected adjacent its inner end to the live truck lever of the center wheel and axle assembly, the outer end of said last named auxiliary lever being connected to the live auxiliary lever adjacent its outer end, and operating means for said brake arrangement connected to said live auxiliary lever intermediate its ends.

6. In a brake arrangement, the combination of a truck frame for a six-wheel truck, said frame having a side frame, spaced transoms and end rails, a bolster mounted between said transoms, wheel and axle assemblies for supporting said truck frame, the end of said wheel and axle assemblies being mounted between the respective end rails and the adjacent transom, the center of said wheel and axle assemblies being mounted between said transoms and adjacent said bolster, live and dead truck levers for each wheel, the truck levers for the end wheels being substantially in the plane of said wheels, the truck levers for the center wheel being disposed inwardly thereof, pull rods connecting the live and dead truck levers of the respective wheels, the rods of the end wheels being disposed below the axles thereof, the rod of said center wheel being disposed above the axle thereof, a dead auxiliary lever adjacent one of the end live truck levers and pivoted adjacent one end thereof to said live truck lever, said auxiliary lever being pivoted to the truck frame intermediate its ends, a live auxiliary lever slidably mounted on said truck frame adjacent the live truck lever of the other end wheel and axle assembly and pivoted adjacent an end thereof to said last named live truck lever, a connection between said live and dead auxiliary levers, a dead auxiliary lever pivoted intermediate its ends to said truck frame and connected adjacent its inner end to the live truck lever of the center wheel and axle assembly, the outer end of said last named auxiliary lever being connected to the live auxiliary lever adjacent its outer end, an operating cylinder mounted on the end rail of the truck frame adjacent the live auxiliary lever and disposed outwardly of said end rail, an equalizer slidably mounted inwardly of said end rail and connected intermediate its ends to the piston of said cylinder, a dead cylinder lever pivoted to said truck frame outwardly of said end rail and connected adjacent its inner end to one end of said equalizer, the outer end of said cylinder lever being connected to said live auxiliary lever intermediate its ends.

7. In a brake arrangement, the combination of a truck frame for a six-wheel truck, said frame having a side frame, spaced transoms and end rails, a bolster mounted between said transoms, wheel and axle assemblies for supporting said truck frame, the end of said wheel and axle assemblies being mounted between the respective end rails and the adjacent transom, the center of said wheel and axle assemblies being mounted between said transoms and adjacent said bolster, live and dead truck levers for each wheel, the truck levers for the end wheels being substantially in the plane of said wheels, the truck levers for the center wheel being disposed inwardly thereof, pull rods connecting the live and dead truck levers of the respective wheels, a dead auxiliary lever adjacent one of the end live truck levers and pivoted adjacent one end thereof to said live truck lever, said auxiliary lever being pivoted to the truck frame intermediate its ends, a live auxiliary lever slidably mounted on said truck frame adjacent the live truck lever of the other end wheel and axle assembly and pivoted adjacent an end thereof to said last named live truck lever, a connection between said live and dead auxiliary levers, a dead auxiliary lever pivoted intermediate its ends to said truck frame and connected adjacent its inner end to the live truck lever of the center wheel and axle assembly, the outer end of said last named auxiliary lever being connected to the live auxiliary lever adjacent its outer end, and operating means for said brake arrangement connected to said live auxiliary lever intermediate its ends.

8. In a brake arrangement, the combination of a truck frame for a six-wheel truck, said frame having a side frame, spaced transoms and end rails, a bolster mounted between said transoms, wheel and axle assemblies for supporting said truck frame, the end of said wheel and axle assemblies being mounted between the respective end rails and the adjacent transom, the center of said wheel and axle assemblies being mounted between said transoms and adjacent said bolster, live and dead truck levers for each wheel, the truck levers for the end wheels being substantially in the plane of said wheels, the truck levers for the center wheel being disposed inwardly thereof, pull rods connecting the live and dead truck levers of the respective wheels, a dead auxiliary lever adjacent one of the end live truck levers and pivoted adjacent one end thereof to said live truck lever, said auxiliary lever being pivoted to the truck frame intermediate its ends, a live auxiliary lever slidably mounted on said truck frame adjacent the live truck lever of the other end wheel and axle assembly and pivoted adjacent an end thereof to said last named live truck lever, a connection between said live and dead auxiliary levers, a dead auxiliary lever pivoted intermediate its ends to said truck frame and connected adjacent its inner end to the live truck lever of the center wheel and axle assembly, the outer end of said last named auxiliary lever being connected to the live auxiliary lever adjacent its outer end, an operating cylinder mounted on the end rail of the truck frame adjacent the live auxiliary lever and disposed outwardly of said end rail, an equalizer slidably mounted inwardly of said end rail and connected intermediate its ends to the piston of said cylinder, a dead cylinder lever pivoted to said truck frame outwardly of said end rail and connected adjacent its inner end to one end of said equalizer, the outer end of said cylinder lever being connected to said live auxiliary lever intermediate its ends.

9. In a brake arrangement, the combination of a truck frame for a six-wheel truck, said frame having a side frame, spaced transoms and end rails, a bolster mounted between said transoms, wheel and axle assemblies for supporting said truck frame, the end of said wheel and axle assemblies being mounted between the respective end rails and the adjacent transom, the center of said wheel and axle assemblies being mounted between said transoms and adjacent said bolster, live and dead truck levers for each wheel, the truck levers for the end wheels being substantially in the plane of said wheels, the truck levers for the center wheel being disposed inwardly thereof, pull rods connecting the live and dead truck levers of the respective wheels, the rods of the end wheels being disposed below the axles thereof, the rod of said center wheel being disposed above the axle thereof, a dead auxiliary lever adjacent one of the end live truck levers and pivoted adjacent one end thereof to said live truck lever, said auxiliary lever being pivoted to the truck frame intermediate its ends, a live auxiliary lever slidably mounted on said truck frame adjacent the live truck lever of the other end wheel and axle assembly and pivoted adjacent an end thereof to said last named live truck lever, a live equalizer lever slidably mounted on said truck frame between said live auxiliary lever and the adjacent end rail and connected adjacent an end thereof to said live auxiliary lever intermediate its ends, the other end of said equalizer lever being connected to the other end of said dead auxiliary lever, a dead auxiliary lever pivoted intermediate its ends to said truck frame and connected adjacent its inner end to the live truck lever of the center wheel and axle assembly, the outer end of said last named auxiliary lever being connected to the live auxiliary lever adjacent its outer end, and an operating cylinder mounted on said truck frame adjacent an end thereof, the piston of said cylinder being operatively connected to said equalizer lever intermediate the ends thereof.

10. In a brake arrangement, the combination of a truck frame for a six-wheel truck, said frame having a side frame, spaced transoms and end rails, a bolster mounted between said transoms, wheel and axle assemblies for supporting said truck frame, the end of said wheel and axle assemblies being mounted between the respective end rails and the adjacent transom, the center of said wheel and axle assemblies being mounted between said transoms and adjacent said bolster, live and dead truck levers for each wheel, the truck levers for the end wheels being substantially in the plane of said wheels, the truck levers for the center wheel being disposed inwardly thereof, pull rods connecting the live and dead truck levers of the respective wheels, a dead auxiliary lever adjacent one of the end live truck levers and pivoted adjacent one end thereof to said live truck lever, said auxiliary lever being pivoted to the truck frame intermediate its ends, a live auxiliary lever slidably mounted on said truck frame adjacent the live truck lever of the other end wheel and axle assembly and pivoted adjacent an end thereof to said last named live truck lever, a live equalizer lever slidably mounted on said truck frame between said live auxiliary lever and the adjacent end rail and connected adjacent an end thereof to said live auxiliary lever intermediate its ends, the other end of said equalizer lever being connected to the other end of said dead auxiliary lever, a dead auxiliary lever pivoted intermediate its ends to said truck frame and connected adjacent its inner end to the live truck lever of the center wheel and axle assembly, the outer end of said last named auxiliary lever being connected to the live auxiliary lever adjacent its outer end, and an operating cylinder mounted on said truck frame adjacent an end thereof, the piston of said cylinder being operatively connected to said equalizer lever intermediate the ends thereof.

11. In a brake arrangement, the combination of a truck frame for a six-wheel truck, said frame having a side frame, spaced transoms and end rails, a bolster mounted between said transoms, wheel and axle assemblies for supporting said truck frame, the end of said wheel and axle assemblies being mounted between the respective end rails and the adjacent transom, the center of said wheel and axle assemblies being mounted between said transoms and adjacent said bolster, live and dead truck levers for each wheel, the truck levers for the end wheels being substantially in the plane of said wheels, the truck levers for the center wheel being disposed inwardly thereof, pull rods connecting the live and dead truck levers of the respective wheels, a dead auxiliary lever adjacent one of the end live truck levers and pivoted adjacent one end thereof to said live truck lever, said auxiliary lever being pivoted to the truck frame intermediate its ends, a live auxiliary lever slidably mounted on said truck frame adjacent the live truck lever of the other end wheel and axle assembly and pivoted adjacent an end thereof to said last named live truck lever, a dead auxiliary lever pivoted intermediate its ends to said truck frame and connected adjacent its inner end to the live truck lever of the center wheel and axle assembly, the outer end of said last named auxiliary lever being connected to the live auxiliary lever adjacent its outer end, and an operating cylinder mounted on said truck frame adjacent an end thereof, the piston of said cylinder being operatively connected to said live auxiliary lever intermediate the ends thereof.

12. In a brake arrangement, the combination of a truck frame, spaced wheel and axle assemblies supporting said truck frame, brake means for the wheels of said wheel and axle assemblies, a live equalizer lever slidably mounted on said truck frame and connected adjacent the ends thereof to said brake means, a cylinder lever pivoted to said truck frame intermediate its ends and connected adjacent one end to said live equalizer lever intermediate its ends, an equalizer connected adjacent one end thereof to said cylinder lever, and a brake cylinder the piston of which is connected to the equalizer intermediate its ends.

13. In a brake arrangement, the combination of a truck frame, spaced wheel and axle assemblies supporting said truck frame, brake means for the wheels of said wheel and axle assemblies including a dead lever, a live equalizer lever slidably mounted on said truck frame and connected to said dead lever, a cylinder lever pivoted to said truck frame and connected to said live equalizer lever, an equalizer connected to said cylinder lever, and a brake cylinder the piston of which is connected to said equalizer.

14. In a brake arrangement, the combination of a truck frame, spaced wheel and axle assemblies supporting said truck frame, brake means for the wheels of said wheel and axle assemblies including a dead lever, a live equalizer lever disposed on one side of the truck frame and slidably mounted on said truck frame and connected to said dead lever, a cylinder lever pivoted to said truck frame and connected to said live equalizer lever, and a brake cylinder the piston of which is connected to said cylinder lever.

15. In a brake arrangement, the combination of a truck frame, spaced wheel and axle assemblies supporting said truck frame, brake means for the wheels of said wheel and axle assemblies, said brake means including live and dead truck levers disposed on opposite sides of each of said wheel and axle assemblies, connections between dead and live truck levers of each wheel and axle assembly, dead auxiliary levers connected to each of said live truck levers, and operating means connected to each of said dead auxiliary levers.

16. In a brake arrangement, the combination of a truck frame, spaced wheel and axle assemblies supporting said truck frame, brake means for the wheels of said wheel and axle assemblies, said brake means including live and dead truck levers disposed on opposite sides of each of said wheel and axle assemblies, connections between dead and live truck levers of each wheel and axle assembly, dead auxiliary levers connected to each of said live truck levers, a live equalizer lever connected to each of said dead auxiliary levers, and operating means connected to said equalizer lever.

17. In a brake arrangement, the combination of a truck frame, a bolster supported on said truck frame, spaced wheel and axle assemblies supporting said truck frame, brake means for the wheels of said wheel and axle assemblies, said brake means including live and dead truck levers disposed on opposite sides of each of said wheel and axle assemblies, connections between dead and live truck levers of each wheel and axle assembly, said connections including a pull rod mounted below one of the axles, a pull rod mounted above one of the axles, one of said pull rods being anti-frictionally supported on said bolster, auxiliary levers connected to each of the live truck levers, a connection between auxiliary levers, and operating means connected to one of said auxiliary levers.

18. In a brake arrangement, the combination of a six-wheel truck, wheels supporting said truck, dead and live truck levers disposed on opposite sides of each wheel, connections between the truck levers on opposite sides of each wheel, the connection between the truck levers of the end wheels being below the wheel center, certain of said truck levers being disposed in the plane of the adjacent wheel and certain other of said truck levers being disposed inwardly of the plane of an adjacent wheel, and operating means connected to certain of said truck levers.

19. In a brake arrangement, the combination of a six-wheel truck, wheels supporting said truck, dead and live truck levers disposed on opposite sides of each wheel, connections between the truck levers on opposite sides of each wheel, the connection between the truck levers of the end wheels being below the wheel center, the connection between the truck levers of the intermediate wheel being above the wheel center, certain of said truck levers being disposed in the plane of the adjacent wheel and certain other of said truck levers being disposed inwardly of the plane of an adjacent wheel, and operating means connected to certain of said truck levers.

20. In a brake arrangement, the combination of a six-wheel truck, wheels supporting said truck, dead and live truck levers disposed on opposite sides of each wheel, connections between the truck levers on opposite sides of each wheel, the connection between certain truck levers being below the wheel center and the connection between other truck levers being above the wheel center, certain of said truck levers being disposed in the plane of the adjacent wheel and certain other of said truck levers being disposed inwardly of the plane of an adjacent wheel, and operating means connected to certain of said truck levers.

21. In a brake arrangement, the combination of a six-wheel truck, wheels supporting said truck, dead and live truck levers disposed on opposite sides of each wheel, connections between the truck levers on opposite sides of each wheel, the connection between the truck levers of the end wheels being below the wheel center, the truck levers of the end wheels being disposed in the plane of said wheels, the truck levers for the intermediate wheel being inboard of the plane of said wheel, and operating means connected to certain of said truck levers.

22. In a brake arrangement, the combination of a six-wheel truck, wheels supporting said truck, dead and live truck levers disposed on opposite sides of each wheel, connections between the truck levers on opposite sides of each wheel, the connection between the truck levers of the end wheels being below the wheel center and the connection between the truck levers of the intermediate wheel being above the wheel center, the truck levers of the end wheels being disposed in the plane of said wheels, the truck levers for the intermediate wheel being inboard of the plane of said wheel, and operating means connected to certain of said truck levers.

23. In a brake arrangement, the combination of a six-wheel truck, wheels supporting said truck, dead and live truck levers disposed on opposite sides of each wheel, connections between the truck levers on opposite sides of each wheel, the connection between certain truck levers being below the wheel center and the connection between other truck levers being above the wheel center, the truck levers of the end wheels being disposed in the plane of said wheels, the truck levers for the intermediate wheel being inboard of the plane of said wheel, and operating means connected to certain of said truck levers.

24. In a brake arrangement, the combination of a truck frame, spaced wheel and axle assemblies supporting said truck frame, brake means for the wheels of said wheel and axle assemblies including a dead lever and a live lever, a live equalizer lever slidably mounted on said truck frame and connected to said dead lever, a cylinder lever pivoted to said truck frame and connected to said live equalizer lever, an equalizer connected to said cylinder lever, and a brake cylinder the piston of which is connected to said equalizer.

25. In a brake arrangement, the combination of a truck frame, spaced wheel and axle assemblies supporting said truck frame, brake means for the wheels of said wheel and axle assemblies including a dead lever and a live lever, a live equalizer lever disposed on one side of the truck frame and slidably mounted on said truck frame and connected to said dead lever, a cylinder lever pivoted to said truck frame and connected to said live equalizer lever, and a brake cylinder the piston of which is connected to said cylinder lever.

26. In a brake arrangement, the combination of spaced wheel and axle assemblies, truck levers on each side of each wheel, a connection between pairs of truck levers, a horizontal lever disposed adjacent each wheel and connected to the adjacent truck lever, a connection between each horizontal lever, said connection including a lever, and operating means connected to said last-named lever.

27. In a brake arrangement, the combination of spaced wheel and axle assemblies, truck levers on each side of each wheel, a connection between pairs of truck levers, a horizontal lever disposed adjacent each wheel and connected to the adjacent truck lever, a connection between each horizontal lever, said connection including a lever, a horizontal lever operatively connected to one of said first named horizontal levers through the lever of said connection, and operating means connected to said last named horizontal lever.

WALTER H. BASELT.